(12) United States Patent
Daoud

(10) Patent No.: US 6,205,221 B1
(45) Date of Patent: Mar. 20, 2001

(54) GROUNDING CONFIGURATION FOR TELECOMMUNUNICATIONS EQUIPMENT

(75) Inventor: Bassel H. Daoud, Parsippany, NJ (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/167,935

(22) Filed: Oct. 6, 1998

(51) Int. Cl.$^7$ .................................................... H04M 9/00
(52) U.S. Cl. .............................. 379/419; 379/325; 439/54
(58) Field of Search ........................... 379/412; 439/922, 439/54; 361/824

(56) References Cited

U.S. PATENT DOCUMENTS 3,936,133 * 2/1976 Splitt et al. .............................. 439/54

* cited by examiner

Primary Examiner—Jack Chiang
Assistant Examiner—Hector Agdeppa
(74) Attorney, Agent, or Firm—Steve Mendelsohn

(57) ABSTRACT

A panel for mounting telecommunications equipment has an insulating body and a grounding strip to provide ground connection to the telecommunications equipment. The grounding strip has a panel portion for mounting the grounding strip to the insulating body and a mounting portion bending away from the insulating body and having one or more mounting holes for mounting the panel to external structure to enable the panel to be mounted to the external structure without requiring spacers to prevent overstress to the insulating material. In one implementation, the panel is a protector panel for receiving five-pin plug-in protectors that provide electrical isolation between multi-wire cabling and telephones and other types of telecommunications equipment.

8 Claims, 5 Drawing Sheets

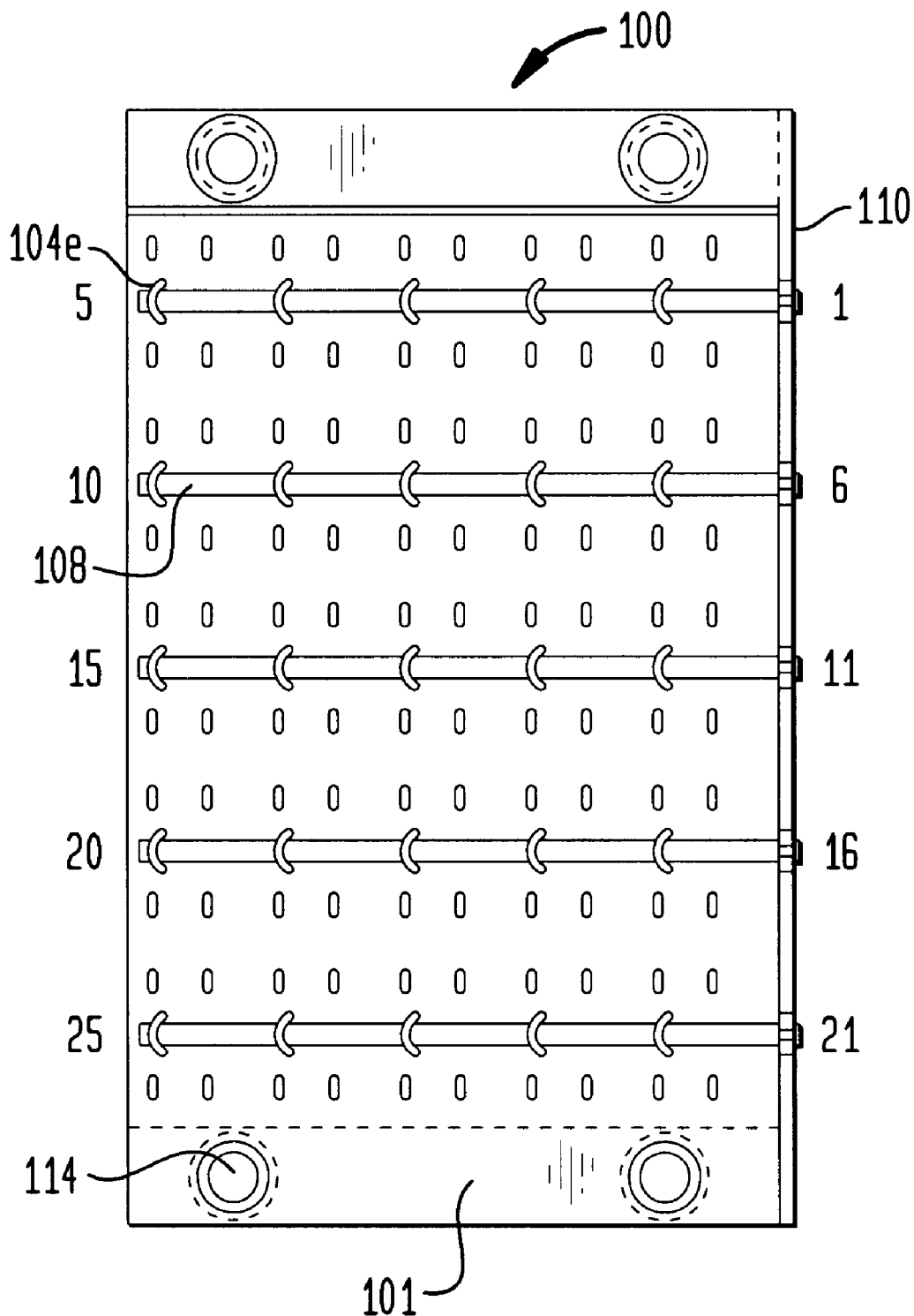

FIG. 3C
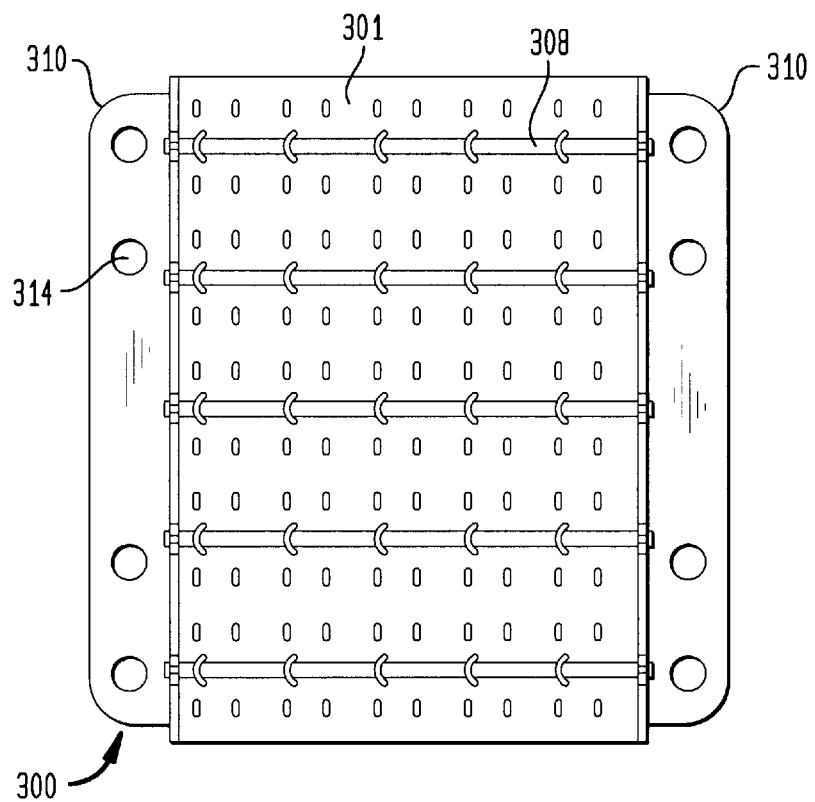
FIG. 4A
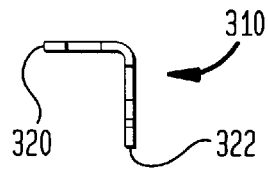
FIG. 4B
FIG. 4C
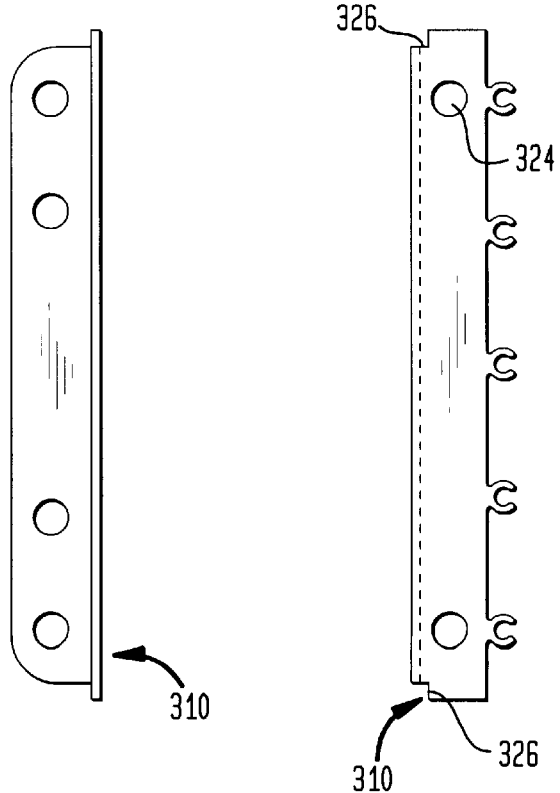

GROUNDING CONFIGURATION FOR TELECOMMUNUNICATIONS EQUIPMENT

BACKGROUND OF THE INVENTION

1. Field of the Invention

The present invention relates to telecommunications equipment, and, in particular, to configurations for grounding panels used to mount electrical connectors such as high-voltage/high-current plug-in protectors.

2. Description of the Related Art

High-voltage/high-current plug-in protectors are used in telecommunications applications to provide electrical isolation between telecommunications equipment in a building and the cabling that carries the electrical signals for the telecommunications equipment to and from the building. A typical five-pin plug-in protector has two conducting pins that are connected to telecommunications equipment (e.g., a telephone), two conducting pins that are connected to wiring broken out from the cabling, and a fifth conducting pin that is connected to ground.

During normal operations, a plug-in protector connects the cable-side conductors to corresponding conductors on the equipment side to allow the flow of telecommunications signals between the equipment and the rest of the telecommunications network. In the case of sufficiently high voltage and/or current at one side, e.g., from a lightning strike at the cable side, the plug-in protector connects the cable-side conductors to ground, thereby preventing damage to the equipment and possible injury to a user of that equipment.

In a building, such as an office building, having a large number of telephones and other telecommunications equipment, each of which requires its own pair of wires from a multi-wire cable, a plug-in protector is used for each pair of wires. These plug-in protectors are typically mounted in a protector panel that is electrically connected to the telecommunications equipment, to the wiring broken out from the cabling, and to ground.

FIGS. 1A–D show views of the end, front, side, and back, respectively, of a conventional protector panel 100 used to provide electrical isolation in a typical telecommunications application. The body 101 of protector panel 100 is made from an insulating material, such as an appropriate insulating plastic. In this particular implementation, protector panel 100 is configured to receive up to 25 five-pin plug-in protectors at 25 different locations. Each location has five holes 102 into which five electrically conducting connectors 104 are inserted and a smaller sixth hole 106 that helps ensure that a plug-in protector is inserted with the correct orientation. Four of the five connectors 104 provide wire-wrap posts on the back side of protector panel 100 for connecting to the cable-side and equipment-side wiring, while the fifth connector 104e forms a loop that is connected (e.g., soldered) to one of a number of grounding bars 108, which in turn are connected (e.g., soldered) to a grounding strip 110.

Grounding bars 108 and grounding strip 110 of protector panel 100 provide the electrical connection between the fifth connector 104e of each plug-in protector location and ground. In order to ensure a good ground connection, protector panel 100 is securely mounted onto other structure (not shown) that provides a good electrical connection between grounding strip 110 and grounded conductors on that other structure. Grounding strip 110 is configured to wrap around one edge 112 of protector panel 100. Protector panel 100 is then bolted onto the other structure using bolts (not shown) that pass through mounting holes 114 in protector panel 100. In order to ensure good electrical connection between grounding strip 110 and the external grounded conductors without damaging the relatively fragile insulating material, electrically conducting spacers 116 are inserted into the mounting holes 114 between the bolt and the grounding strip 110. Each spacer 116 has a lip 118 that ensures that pressure applied by the bolt will result in a secure grounding connection without applying too much pressure to the insulating material.

FIGS. 2A–C show views of the end, front, and side, respectively, of grounding strip 110 of protector panel 100 of FIG. 1. FIGS. 2A–C correspond to the views shown in FIGS. 1A–C. Grounding strip 110 is mounted onto body 101 of protector panel 100 via screw holes 202, while mounting holes 204 align with mounting holes 114 in body 101 for receiving the mounting bolts used to mount protector panel 100 to external structure. Mounting holes 204 in grounding strip 110 have a smaller diameter than mounting holes 114 in body 101 in order to abut and support lips 118 of spacers 116. Grounding strip 110 is typically made by cutting material from a sheet of conducting metal such as aluminum, drilling the mounting and screw holes, and then bending the material 90 degrees at one edge.

SUMMARY OF THE INVENTION

The present invention is directed to a grounding configuration for telecommunications equipment such as the protector panels used to receive five-pin plug-in protectors used to provide electrical isolation between cabling and telecommunications equipment. The grounding configuration of the present invention ensures a good grounding connection between the protector panel and external structure while protecting the insulating body of the protector panel from high mounting pressure (e.g., overstress) without relying on special spacers. In addition, certain embodiments of the present invention have a configuration that makes manufacturing of the protector panels less wasteful of material and therefore cheaper to make.

In one embodiment, the present invention is a panel for mounting telecommunications equipment. The panel comprises an insulating body and a conducting grounding strip configured to the insulating body to provide a grounding connection for the panel. The grounding strip has a panel portion mounting the grounding strip to the insulating body and a mounting portion bending away from the insulating body and having one or more mounting holes for mounting the panel to external structure to enable the panel to be mounted to the external structure without requiring spacers to prevent overstress to the insulating material.

BRIEF DESCRIPTION OF THE DRAWINGS

Other aspects, features, and advantages of the present invention will become more fully apparent from the following detailed description, the appended claims, and the accompanying drawings in which:

FIGS. 1A–D show views of the end, front, side, and back of a conventional protector panel used to provide electrical isolation in a typical telecommunications application;

FIGS. 3A–C show views of the end, front, and back, respectively, of a protector panel, according to one embodiment of the present invention; and FIGS. 4A–C show views of the end, front, and side, respectively, of the grounding strip of the protector panel of FIG. 3.

DETAILED DESCRIPTION

Figure 1A:
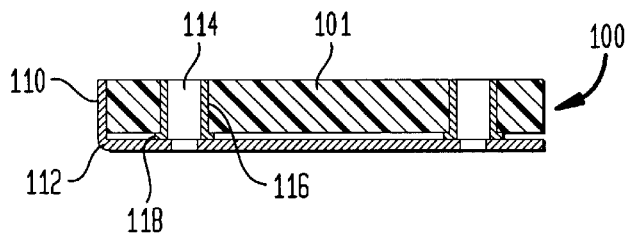
Figure 1B:
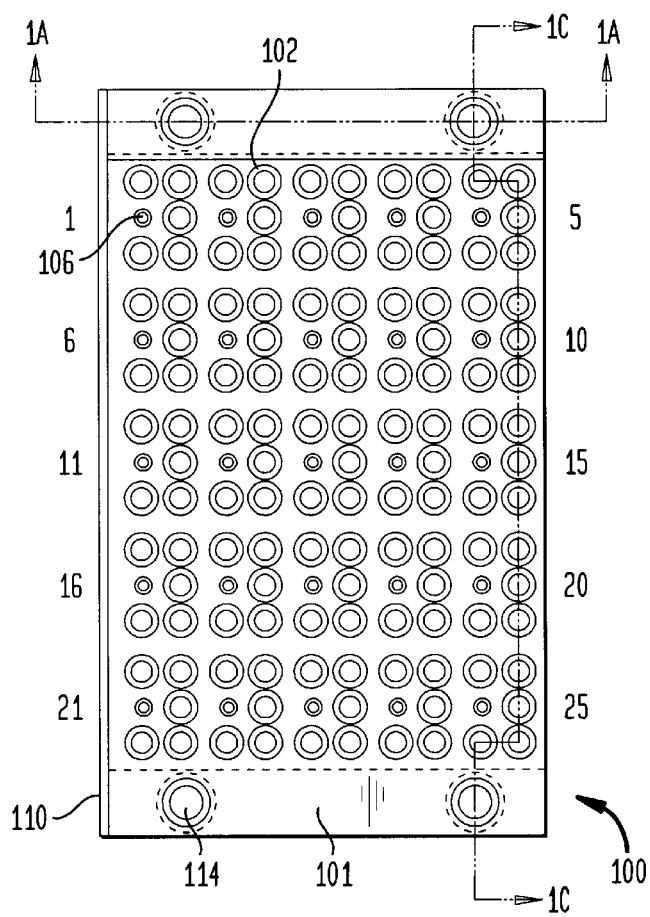
Figure 1C:
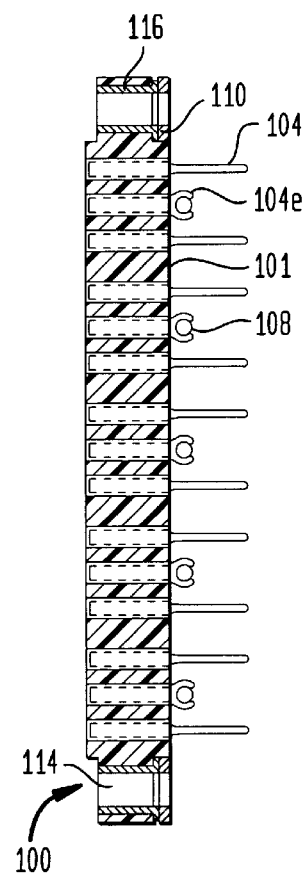
Figure 2A:
FIGS. 2A–C show views of the end, front, and side, respectively, of the grounding strip of the protector panel of FIG. 1.
Figure 2B:
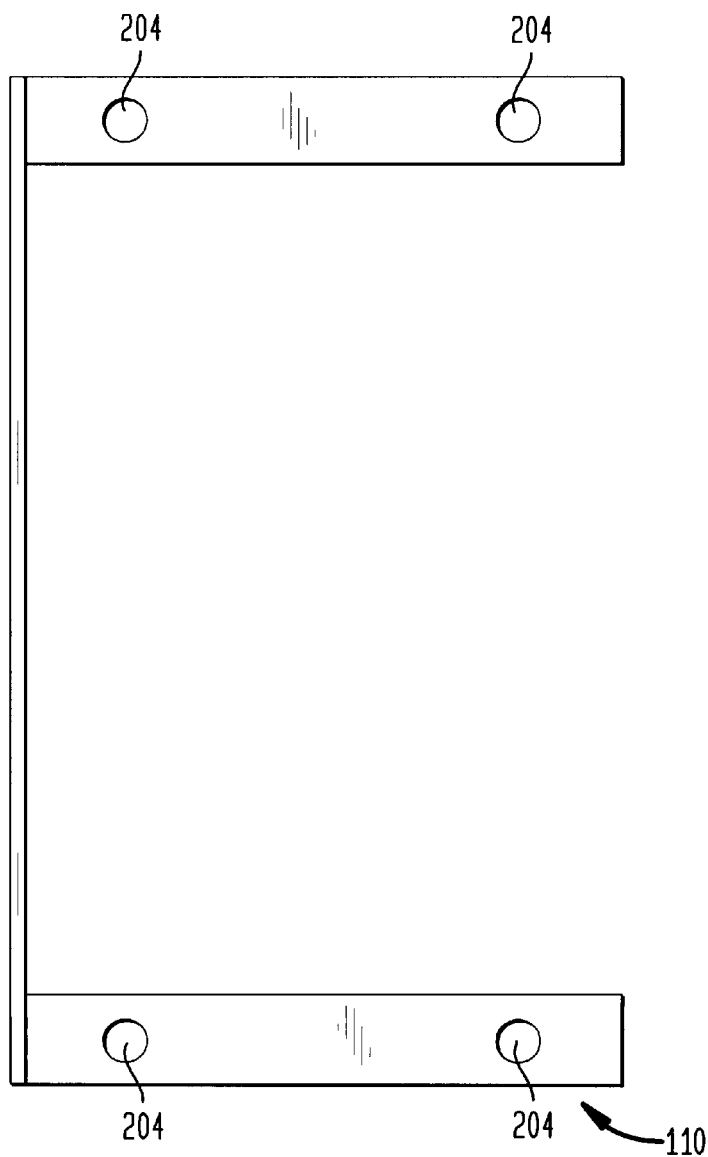
Figure 2C:
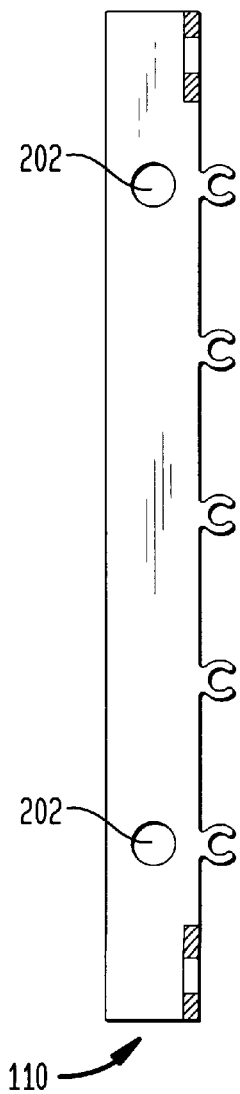
Figure 3A:
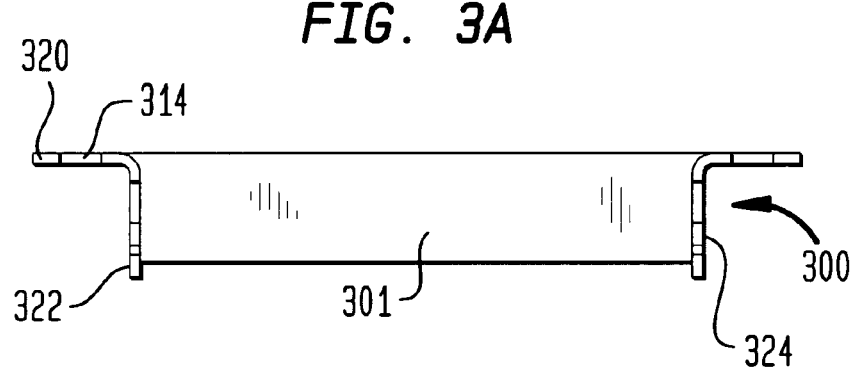
Figure 3B:
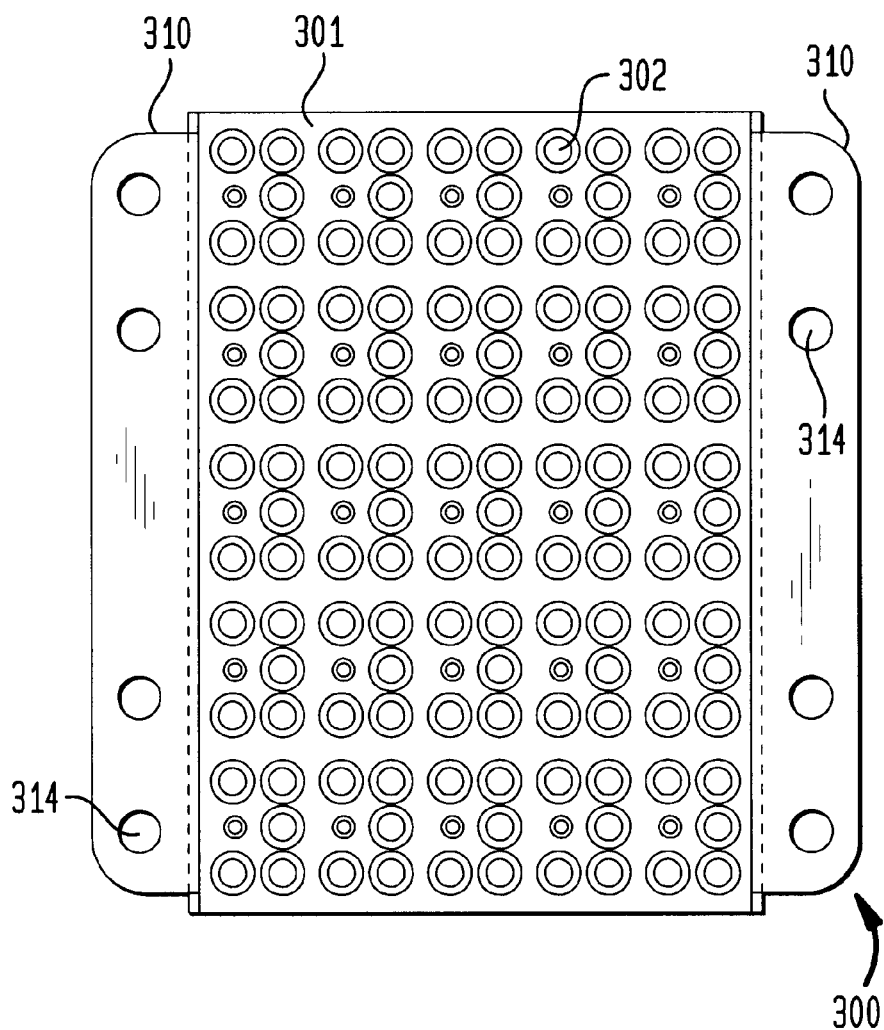

FIGS. 3A–C show views of the end, front, and back, respectively, of a protector panel 300, according to one embodiment of the present invention. As in protector panel 100 of FIG. 1, the body 301 of protector panel 300 is made from an appropriate insulating material configured with 25 locations of holes 302 for receiving five-pin plug-in protectors. Similar to protector panel 100, the ground connector for each location is connected (e.g., soldered) to a grounding bar 308, which in turn is connected (e.g., soldered), at either end, to a grounding strip 310. However, each grounding strip 310 of protector panel 300 is significantly different from grounding strip 110 of protector panel 100.

Rather than bending under the body of the protector panel as is the case of grounding strip 110 of protector panel 100, grounding strip 310 bends away from body 301 of protector panel 300. In particular, grounding strip 310 has a mounting portion 320 and panel portion 322. Panel portion 322 has screw holes 324 for mounting grounding strip 310 onto body 301. In addition, grounding strip 310 has mounting holes 314 located in mounting portion 320 to enable protector panel 300 to be mounted to external structure without having to pass bolts through body 301. As such, the configuration of grounding strip 310 enables protector panel 300 to be securely mounted onto external structure to provide good electrical contact between grounding strip 310 and external grounded structure without having to use separate spacers, such as spacers 116, to prevent application of too much pressure to body 301.

FIGS. 4A–C show views of the end, front, and side, respectively, of grounding strip 310 of protector panel 300 of FIG. 3. Like grounding strip 110 of protector panel 100, grounding strip 310 can be manufactured made by cutting material from a sheet of conducting metal such as aluminum, drilling the mounting and screw holes, and then bending the material about 90 degrees at one edge. However, because the bend in grounding strip 310 is away from the body of the protector panel, instead of towards the body as in grounding strip 110, the size of the sheet of conducting metal needed to manufacture each grounding strip is much smaller than that required for grounding strip 110. As a result, grounding strips 310 according to the present invention can be manufactured more economically than conventional grounding strips 110.

In one implementation, the body 301 is configured with a depression to receive the panel portion 322 of grounding strip 310, such that the panel portion 322 is mounted flush with the body 301. As shown in FIG. 4C, grounding strip 310 has notches 326 at either end. The notches mate with structure in the body 301 to hold body 301 securely in place without applying too much pressure to the insulating material.

Although the present invention has been described in the context of protector panels for five-pin plug-in protectors, those skilled in the art will understand that the present invention can be applied to other types of panels for telecommunications equipment in which ground connections must be provided.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A panel for mounting telecommunications equipment, comprising:
   (a) an insulating body comprising insulating material having a front face configured with one or more sets of holes to receive one or more plug-in protectors, a back face approximately parallel to the front face and a plurality of side faces extending between the front and back faces; and
   (b) a conducting grounding strip configured to the insulating body to provide a grounding connection for the panel, wherein the grounding strip has (i) a panel portion mounting the grounding strip to one of the side faces of the insulating body and (ii) a mounting portion bending away from the insulating body approximately parallel to the front and back faces of the insulating body and having one or more mounting holes for mounting the panel to external structure to enable the panel to be securely mounted to the external structure without applying pressure directly to the insulating body and without requiring spacers to prevent overstress to the insulating material.

2. The invention of claim 1, wherein the insulating body has a depression adapted to receive the panel portion of the grounding strip to enable the grounding strip to be mounted flush to the insulating body.

3. The invention of claim 2, wherein the grounding strip has at least one notch to engage material of the insulating body to hold the insulating body in place when the panel is mounted onto the external structure without overstressing the insulating material.

4. The invention of claim 3, wherein the panel is a protector panel configured to receive a plurality of five-pin plug-in protectors and to terminate wiring corresponding to the plug-in protectors.

5. The invention of claim 1, wherein the panel is a protector panel configured to receive a plurality of five-pin plug-in protectors and to terminate wiring corresponding to the plug-in protectors.

6. A protector panel for receiving five-pin plug-in protectors that provide electrical isolation for telecommunications equipment, the protector panel comprising:
   (a) an insulating body comprising insulating material having a front face configured with one or more sets of holes to receive a plurality of five-pin plug-in protectors, a back face approximately parallel to the front face and a plurality of side faces extending between the front and back faces; and
   b) two conducting grounding strip configured to a pair of opposing side faces of the insulating body to provide a grounding connection for the protector panel, wherein each grounding strip has (i) a panel portion mounting the grounding strip to one of the opposing side faces of the insulating body and (ii) a mounting portion bending away from the insulating body approximately parallel to the front and back faces of the insulating body and having one or more mounting holes for mounting the panel to external structure to enable the panel to be securely mounted to the external structure without applying pressure directly to the insulating body and without requiring spacers to prevent overstress to the insulating material.

7. The invention of claim 6, wherein the insulating body has a depression adapted to receive the panel portion of the grounding strip to enable the grounding strip to be mounted flush to the insulating body.

8. The invention of claim 7, wherein the grounding strip has at least one notch to engage material of the insulating body to hold the insulating body in place when the panel is mounted onto the external structure without overstressing the insulating material.

* * * * *